Figure 1:
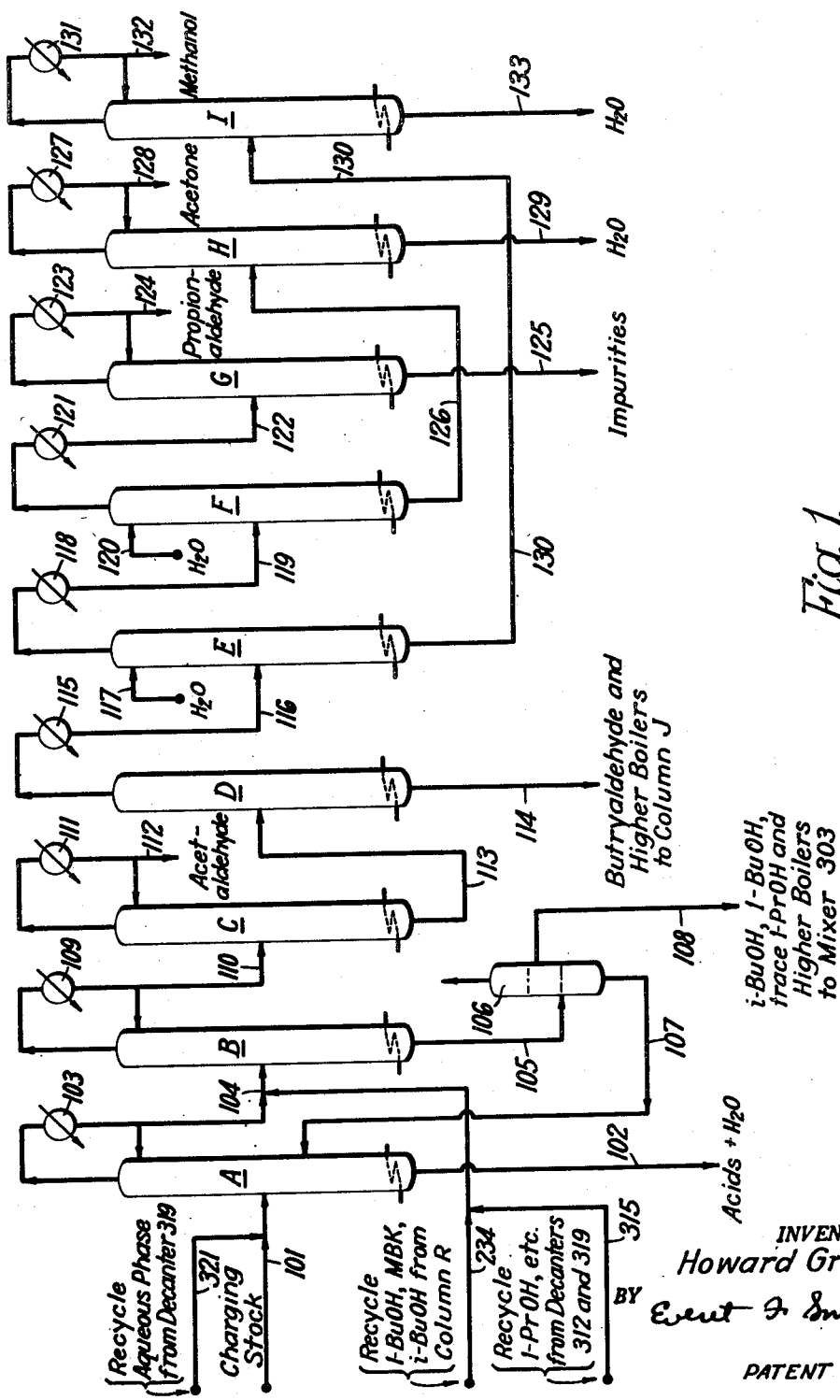

Aug. 14, 1951

H. GREKEL 2,564,200

AZEOTROPIC DISTILLATION OF ALCOHOLS
FROM METHYL n-BUTYL KETONE

Filed May 28, 1949

3 Sheets-Sheet 3

INVENTOR.
Howard Grekel
BY Everet F. Smith

PATENT AGENT

Patented Aug. 14, 1951

2,564,200

UNITED STATES PATENT OFFICE 2,564,200

AZEOTROPIC DISTILLATION OF ALCOHOLS FROM METHYL n-BUTYL KETONE

Howard Grekel, Tulsa, Okla., assignor to Stanolind Oil and Gas Company, Tulsa, Okla., a corporation of Delaware Application May 28, 1949, Serial No. 95,978

7 Claims. (Cl. 202—42)

This invention relates to the separation and purification of organic oxygenated compounds. More particularly, it relates to the separation of 1-butanol from methyl n-butyl ketone, and to an integrated process for the separation of 1-butanol and methyl n-butyl ketone from mixtures of organic oxygenated compounds.

In the production of organic oxygenated compounds by various processes, such as the oxidation of normally liquid hydrocarbons, the hydrogenation of carbon oxides, the reaction of olefins with carbon monoxide and hydrogen, and the like, products of great complexity are commonly obtained, comprising a wide variety of organic oxygenated compounds, such as alcohols, aldehydes, and ketones, of a broad range of molecular weight. For example, when carbon monoxide is hydrogenated in the presence of an alkali-promoted fluidized iron catalyst at temperatures around 450 to 680° F. and pressures around 100 to 500 pounds per square inch, an aqueous phase and a hydrocarbon phase are produced, both rich in organic oxygenated compounds. The following is a typical analysis, dry basis, of the organic materials in an aqueous phase obtained in such a process:

|  | Per cent by wt. |
|---|---|
| Acetaldehyde | 6.9 |
| Propionaldehyde | 2.3 |
| Acetone-methanol | 11.1 |
| Butyraldehyde and ethyl acetate | 2.2 |
| Methyl ethyl ketone | 4.0 |
| Ethanol | 46.2 |
| Methyl propyl ketone | 1.1 |
| 1-propanol | 12.1 |
| Methyl n-butyl ketone | 0.1 |
| 1-butanol and heavier | 14.0 |

The separation of the carbonyl compounds and of the alcohols in substantially pure form from such mixtures is very difficult, owing to the fact that certain aldehydes and ketones therein have boiling points near the boiling points of certain alcohols, and owing to the further fact that numerous azeotropes are formed by the various components of the mixture. Thus, for example, it has been found that 1-butanol (boiling point, 117.7° C.) cannot be separated by conventional fractional distillation from methyl n-butyl ketone (boiling point, 127.2° C.), owing to the fact that the two compounds form an azeotropic mixture boiling around 116° C. and containing approximately 19 percent by weight of the methyl n-butyl ketone.

Now, however, I have discovered that methyl n-butyl ketone can be removed substantially completely from a mixture thereof with 1-butanol by fractionally distilling in the presence of 1-propanol and water and withdrawing an azeotropic mixture of 1-propanol, water, and methyl n-butyl ketone boiling around 87 to 87.5° C. and containing up to about 10 percent by weight of methyl n-butyl ketone and approximately 27 percent by weight of water. I have further discovered that a complex aqueous mixture of organic oxygenated compounds comprising methyl n-butyl ketone, 1-butanol, and 1-propanol can be separated in part by fractionally distilling therefrom an azeotropic mixture of 1-propanol, water, and methyl n-butyl ketone, leaving 1-butanol behind. However, in carrying out such a distillation, I have observed that it is extremely difficult to effect a complete separation between 1-butanol and the azeotropic mixture of methyl n-butyl ketone, water, and 1-propanol. Ordinarily, therefore, the distillate therefrom contains a small proportion of 1-butanol as a contaminant. In order to recover purified methyl n-butyl ketone from the contaminated distillate, it is therefore necessary to separate 1-propanol, water, and the small proportion of contaminating 1-butanol therefrom. It is also impossible, however, to effect a complete separation of 1-propanol from mixtures with methyl n-butyl ketone and water by ordinary fractional distillation. This separation, I have now discovered, can be effected if the water is first removed, suitably by azeotropic distillation with a hydrocarbon entrainer; thereafter, the 1-propanol may be fractionally distilled in substantially pure form from the dry mixture thereof with methyl n-butyl ketone. Subsequently, the 1-butanol contaminant may be removed by distillation as the binary azeotrope with methyl n-butyl ketone, leaving substantially pure methyl n-butyl ketone as a residuum, which may be further purified by fractional distillation. The azeotrope of 1-butanol and methyl n-butyl ketone may be recycled to the initial fractionation step, where the split between 1-butanol and methyl n-butyl ketone is again effected. The bottom stream from the initial fractionation step, rich in 1-butanol, may be fractionally distilled to separate the 1-butanol in substantially pure form.

One object of my invention is to separate substantially pure 1-butanol and substantially pure methyl n-butyl ketone from a mixture thereof. Another object of my invention is to separate the components of a mixture of 1-propanol, 1-butanol, and methyl n-butyl ketone. A further object is to separate 1-butanol and methyl n-butyl ketone as substantially pure fractions from a mixture thereof with other organic oxygenated compounds. A further object is to separate 1-butanol and methyl n-butyl ketone as substantially pure fractions from a mixture thereof with water. A still further object is to separate 1-butanol and methyl n-butyl ketone as substantially pure fractions from an aqueous mixture of water-soluble organic oxygenated compounds obtained in the hydrogenation of carbon monoxide or by the oxidation of normally liquid hydrocarbons. Other objects of my invention and its advantages over the prior art will be apparent from the following description.

On the basis of the observations set forth above, I have devised an integrated process for accomplishing the objects of my invention. My new process may comprise the following steps:

1. A mixture of 1-butanol and methyl n-butyl ketone is fractionally distilled in the presence of 1-propanol and water, and a distillate fraction comprising methyl n-butyl ketone, water, and 1-propanol is withdrawn, containing a small proportion of 1-butanol, the proportion of 1-butanol to methyl n-butyl ketone being substantially less than the ratio of 1-butanol to methyl n-butyl ketone in the binary azeotrope thereof.

2. The distillation bottoms, comprising 1-butanol substantially free from methyl n-butyl ketone, is dried if it contains water, and is then fractionally distilled to separate the 1-butanol in substantially pure form.

3. The distillate fraction from step 1 is dried by conventional means, or by azeotropic distillation with a suitable hydrocarbon entrainer.

4. The dried material from step 3 is subjected to fractional distillation, and the 1-propanol is withdrawn overhead in substantially pure form.

5. The 1-butanol in the distillation residue of step 4 is thereafter completely removed by distillation in the form of its azeotrope with methyl n-butyl ketone, leaving a residuum of methyl n-butyl ketone free from 1-butanol.

6. The azeotropic mixture of 1-butanol and methyl n-butyl ketone is recycled to step 1 for further separation of 1-butanol and methyl n-butyl ketone.

7. The methyl n-butyl ketone residuum from step 5 is further purified by fractional distillation.

The drying operation in step 3 of my process may suitably be carried out by azeotropic distillation with any non-reactive organic compound, preferably a hydrocarbon, which forms a binary azeotrope with water or a ternary azeotrope with water and 1-propanol boiling sufficiently below the other boiling points involved in the system for separation by fractional distillation. Specifically, since the azeotropic mixture of methyl n-butyl ketone, water, and 1-propanol boils at 87 to 87.5° C., the hydrocarbon should form one of the aforementioned types of azeotropes boiling not higher than around 80° C. For this purpose, hydrocarbons having from five to seven carbon atoms in the molecule are satisfactory, including pentanes, pentenes, hexanes, hexenes, heptanes, heptenes, cyclopentane, cyclopentene, methylcyclopentane, dimethylcyclopentanes, cyclohexane, methylcyclohexane, cyclohexene, methylcyclohexenes, benzene, toluene, and the like.

The attached flowsheets illustrate an application of my invention to the problem of separating a complex aqueous solution of organic oxygenated compounds. For simplicity, pumps, valves, heat exchangers, reflux drums, and other auxiliary equipment have been omitted.

A charging stock, comprising essentially an aqueous solution of alcohols, aldehydes, ketones, and carboxylic acids, obtained for example in the hydrogenation of carbon monoxide with a fluidized, alkali-promoted iron catalyst, is introduced through line 101 (Figure 1) into an intermediate section of column A, where it is fractionally distilled. From the bottom of column A through line 102 is withdrawn an aqueous stream containing all or substantially all of the carboxylic acids in the charging stock, together with a major proportion of the water. Substantially all of the other organic oxygenated compounds are taken off overhead through condenser 103.

Figure 3:
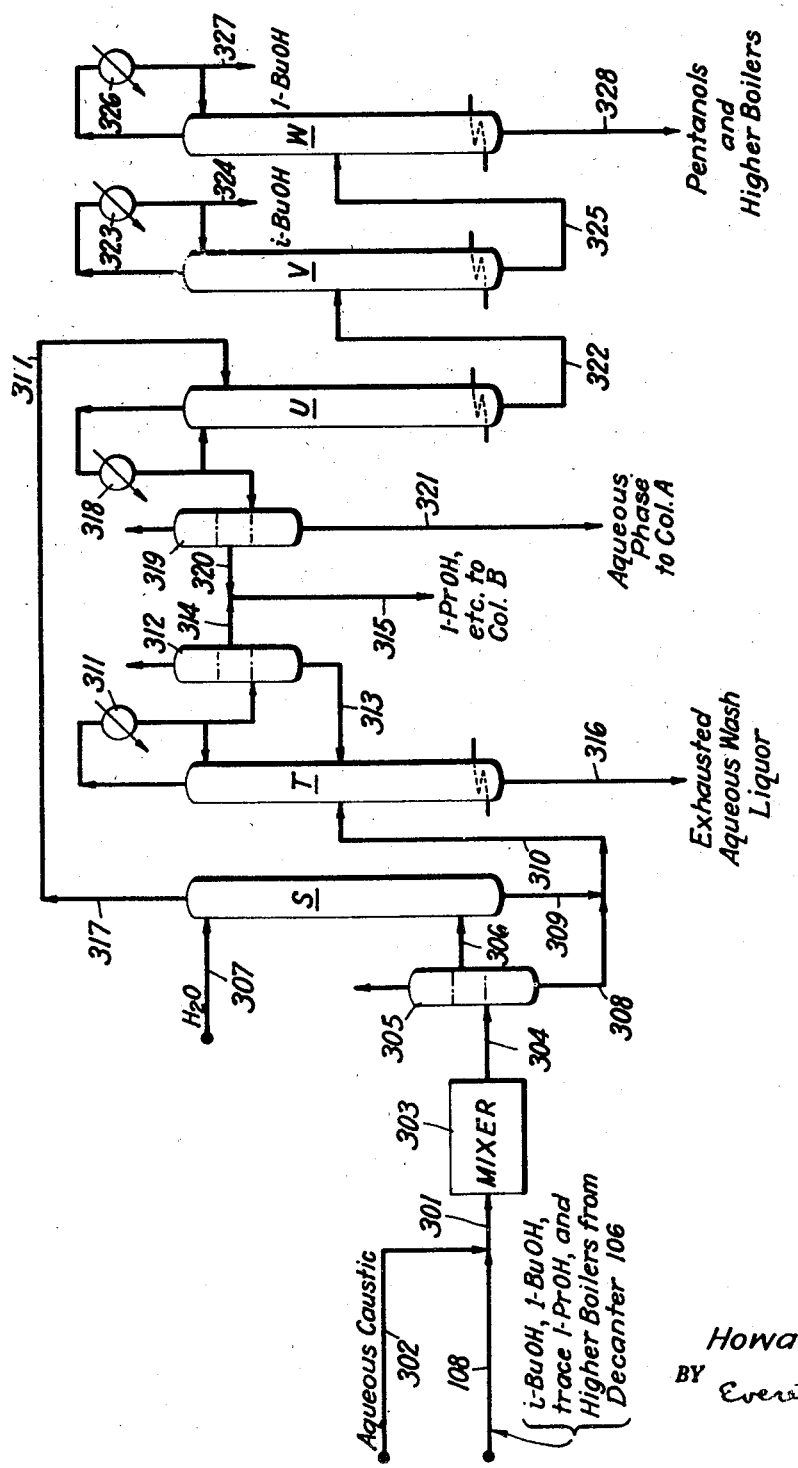

The overhead stream from column A is introduced through line 104 into an intermediate section of column B, where it is further fractionated. From the bottom of column B is withdrawn a stream, ordinarily heterogeneous, containing most of the isobutyl alcohol, 1-butanol, and higher alcohols in the charging stock, together with water and a small proportion of 1-propanol. This stream is led through line 105 into decanter 106, from which the aqueous phase is returned through line 107 to an intermediate section of column A, while the organic phase is withdrawn through line 108 and further processed as shown in Figure 3. The overhead stream from column B contains all but a small proportion of the organic oxygenated compounds from the charging stock boiling below isobutyl alcohol. In addition, it contains substantially all of the methyl n-butyl ketone, which distills overhead as an azeotropic mixture with water and 1-propanol, together with small proportions of isobutyl alcohol and 1-butanol.

The overhead stream from column B is led through condenser 109 and line 110 into an intermediate section of column C, where it is further fractionated, and any acetaldehyde contained therein is withdrawn through condenser 111 and line 112 as a substantially pure product.

Figure 2:
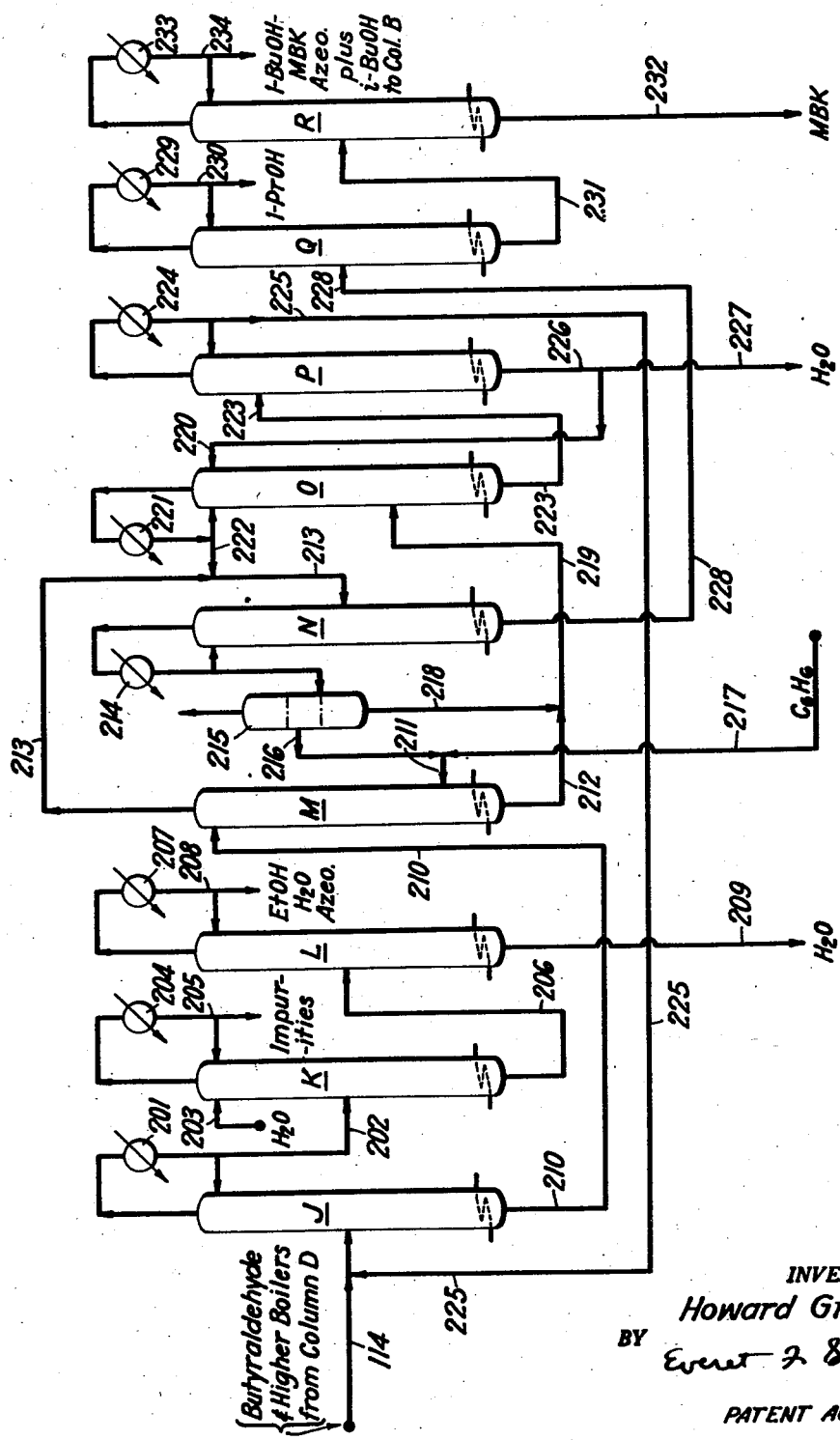

The bottom stream from column C is led through line 113 into an intermediate section of column D, where the organic oxygenated compounds are split into two streams. The bottom stream from column D, comprising butyraldehyde and higher boilers, is withdrawn through line 114 and further processed as shown in Figure 2, beginning with column J.

The overhead stream from column D is led through condenser 115 and line 116 into an intermediate section of column E, where it is subjected to extractive distillation in the presence of water. A sufficient quantity of water is introduced through line 117 into the top of column E to selectively entrain all of the methanol entering the column, while allowing the vapors of the other organic oxygenated compounds to pass overhead. For this purpose, the quantity of water entering the top of column E should ordinarily be sufficient to give an aqueous bottom stream containing between about 1 and 35 percent by volume of methanol, optimally around 5 percent.

The overhead stream from column E, containing predominantly acetone and propionaldehyde, is led through condenser 118 and line 119 into an intermediate section of column F, where it is again subjected to extractive distillation in the presence of water. A sufficient quantity of water is introduced through line 120 into the upper part of column F to dissolve the acetone from the ascending vapor stream and to produce an aqueous bottom stream containing preferably between about 2 and 10 percent by volume of acetone, optimally around 5 percent. Propionaldehyde and impurities emerge overhead through condenser 121.

The overhead stream from column F is led through line 122 into an intermediate section of column G. Therein, the propionaldehyde is distilled overhead as a substantially pure stream, and is withdrawn through condenser 123 and line 124. The impurities, comprising esters and higher boilers, emerge from the bottom of column G through line 125, and may be further processed by batch distillation to isolate the individual constituents thereof.

The aqueous solution of acetone emerging from the bottom of column F is led through line 126 into an intermediate section of column H. Therein, the acetone is stripped out through condenser 127, and is withdrawn as a substantially pure, anhydrous stream through line 128. The exhausted water emerges from the bottom of the column through line 129.

The aqueous solution of methanol emerging from the bottom of column E is led through line 130 into an intermediate section of column I. Therein, the methanol is distilled overhead through condenser 131, and is withdrawn through line 132 as a substantially pure, anhydrous stream. The exhausted water is withdrawn from the bottom of column I through line 133. The water streams from columns H and I may be discarded or recycled as desired, suitably to the tops of columns E and F.

The bottom stream from column D, comprising butyraldehyde and higher boilers, is led through line 114 into an intermediate section of column J (Figure 2), where it is fractionally distilled to separate substantially all of the ethanol as an overhead stream.

The overhead stream from column J is led through condenser 201 and line 202 into an intermediate section of column K, where it is extractively distilled in the presence of water. A sufficient quantity of water is introduced through line 203 into the top of column K to dissolve most of the ethanol from the ascending vapor stream, while allowing any impurities to pass overhead. Ordinarily, adequate purification of the ethanol is produced by using a quantity of water sufficient to produce an aqueous bottom stream containing around 5 percent by volume of ethanol. The impurities emerge through condenser 204 and are withdrawn through line 205.

The aqueous solution of ethanol emerging from the bottom of column K is led through line 206 into an intermediate section of column L, where the ethanol is stripped out as the ethanol-water azeotrope and is withdrawn through condenser 207 and line 208. The exhausted water stream flows out of the bottom of column L through line 209.

The bottom stream from column J flows through line 210 into the top of extraction column M, where it is countercurrently contacted with benzene or other suitable hydrocarbon, entering the bottom of column M through line 211. The benzene extracts most of the organic oxygenated compounds from the stream entering the top of column M, and an exhausted aqueous stream emerges from the bottom of column M through line 212.

A benzene solution of organic oxygenated compounds flows out of the top of column M and is led through line 213 into column N at an intermediate point. Column N serves simultaneously for removing water from the entering stream as the benzene-water azeotrope, and for removing substantially all benzene from the entering stream. The benzene-water-1-propanol azeotrope, and excess benzene in the form of the benzene-1-propanol azeotrope, are distilled overhead through condenser 214, and the condensate is led into decanter 215, from which the benzene layer is recycled through lines 216 and 211 to extraction column M, makeup benzene being added as required through line 217, and the aqueous phase is withdrawn through line 218 and combined in line 212 with the exhausted aqueous stream from extraction column M.

The combined aqueous streams from extraction column M and decanter 215 are led through line 219 into an intermediate section of column O, where they are stripped and extractively distilled in the presence of an excess of water, introduced into the top of column through line 220. By this means, substantially all hydrophilic oxygenated compounds are carried to the bottom of the column, while all of the benzene entering the column is allowed to pass overhead through condenser 221, from which it is withdrawn through line 222 and combined with the benzene stream entering column N through line 213.

The benzene-free aqueous solution of organic oxygenated compounds flowing from the bottom of column O is led through line 223 into an upper section of stripper column P. Therein, substantially all volatile organic oxygenated compounds are stripped out and taken overhead through condenser 224, from which they are withdrawn through line 225 and recycled through line 114 to column J. The exhausted water stream flowing from the bottom of column P through line 226 is returned in part through line 220 to the top of column O, and the remainder is withdrawn through line 227 and discarded, or used elsewhere in the process.

The dry stream of organic oxygenated compounds flowing out of the bottom of column N is led through line 228 into an intermediate section of column Q. Therein, 1-propanol is distilled overhead as a substantially pure stream, and is condensed in cooler 229 and withdrawn through line 230.

The bottom stream from column Q is led through line 231 into an intermediate section of fractionating column R, where a separation is effected between methyl n-butyl ketone and impurities. The impurities, including isobutyl alcohol and a small proportion of 1-butanol, are distilled overhead, the latter as an azeotrope with a portion of the methyl n-butyl ketone. The entire overhead stream from column R is condensed in cooler 233 and recycled through lines 234 and 104 to column B (Figure 1). The methyl n-butyl ketone is withdrawn from the bottom of column R through line 232, and may be redistilled if desired to obtain a pure, water-white product.

The organic phase from decanter 106 (Fig. 1) is withdrawn through line 108 and is commingled in line 301 (Figure 3) with an aqueous caustic stream from line 302. An aqueous 5 percent solution of sodium hydroxide may suitably be used, preferably in at least sufficient quantity to neutralize all of the organic acids in the organic phase. The combined streams may be thoroughly agitated in mixer 303, and are then led through line 304 into decanter 305. The organic phase from decanter 305 is led through line 306 into the bottom of washer column S, where it is countercurrently contacted with a stream of water, introduced into the top of the column through line 307. Substantially all of the organic acids and organic-acid salts are thereby removed from the organic phase.

The aqueous streams flowing from decanter 305 through line 308 and from washer column S through line 309 are combined and led through line 310 into stripper column T. Therein, substantially all volatile organic oxygenated compounds are stripped out and taken overhead through condenser 311 into decanter 312. From the decanter, the aqueous phase is refluxed through line 313 to an intermediate portion of column T, while the organic phase, comprising 1-propanol, water, and other organic oxygenated compounds, is withdrawn through line 314 and recycled through line 315, 234, and 104 to column B (Figure 1), where the 1-propanol and water assist in separating methyl n-butyl ketone from 1-butanol. The exhausted aqueous wash liquor from the bottom of column T is withdrawn through line 316, and may be discarded or further processed to recover any organic-acid salts contained therein.

The washed organic stream from the top of column S is led through line 317 into an upper section of drier column U. Therein, the water is distilled overhead in the form of azeotropes with the various organic oxygenated compounds, and the distillate is led through condenser 318 into decanter 319. The organic phase in decanter 319 is withdrawn through line 320 and is recycled in combination with the organic phase from decanter 312. The aqueous phase, containing a small proportion of dissolved organic oxygenated compounds, is withdrawn through line 321 and is recycled through line 101 to column A (Figure 1).

The dry stream of organic oxygenated compounds flowing out of the bottom of column U is led through line 322 into an intermediate section of column V, where the isobutyl alcohol is distilled overhead in substantially pure form through condenser 323, and is withdrawn through line 324.

The bottom stream from column V is led through line 325 into an intermediate section of column W, where the 1-butanol is distilled overhead in substantially pure form through condenser 326, and is withdrawn through line 327.

The bottom stream from column W, comprising pentanols and higher oxygenated compounds, is withdrawn through line 328, and may be further processed to separate the individual components thereof.

While I have described my invention with reference to a specific embodiment thereof, it is to be understood that I may make numerous variations therein within the scope of the description and claims. In general, it may be said that any modifications or equivalents that would ordinarily occur to one skilled in the art are to be considered as lying within the scope of my invention.

In accordance with the foregoing description, I claim as my invention:

1. A process for separating components of a mixture comprising methyl n-butyl ketone, 1-propanol, and water, together with a quantity of 1-butanol having a ratio to said methyl n-butyl ketone smaller than the ratio of 1-butanol to methyl n-butyl ketone in the binary azeotrope thereof; drying said first distillate fraction; distilling the dried distillate fraction and separating therefrom a second distillate fraction comprising essentially 1-propanol; and further distilling said dried distillate fraction and separating therefrom a third distillate fraction containing substantially all of said 1-butanol as an azeotropic mixture with methyl n-butyl ketone, leaving a residuum of purified methyl n-butyl ketone.

2. A process for separating components of a mixture comprising methyl n-butyl ketone, 1-propanol, and water, together with a quantity of 1-butanol having a ratio to said methyl n-butyl ketone smaller than the ratio of 1-butanol to methyl n-butyl ketone in the binary azeotrope thereof; and a second distillate fraction containing 1-butanol substantially free from methyl n-butyl ketone; drying said first distillate fraction; distilling the dried distillate fraction and separating therefrom a third distillate fraction comprising essentially 1-propanol; and further distilling said dried distillate fraction and separating therefrom a fourth distillate fraction containing substantially all of said 1-butanol as an azeotropic mixture with methyl n-butyl ketone, leaving a residuum of purified methyl n-butyl ketone.

3. A process for separating components of a mixture comprising methyl n-butyl ketone, 1-propanol, and water, together with a quantity of 1-butanol having a ratio to said methyl n-butyl ketone smaller than the ratio of 1-butanol to methyl n-butyl ketone in the binary azeotrope thereof, and a second distillate fraction containing 1-butanol substantially free from methyl n-butyl ketone; drying said first distillate fraction; distilling the dried distillate fraction and separating therefrom a third distillate fraction comprising essentially 1-propanol; further distilling said dried distillate fraction and separating therefrom a fourth distillate fraction containing substantially all of said 1-butanol as an azeotropic mixture with methyl n-butyl ketone, leaving a residuum of purified methyl n-butyl ketone; and separating substantially pure 1-butanol from said second distillate fraction.

4. In a process for separating the components of a mixture consisting essentially of 1-propanol, methyl n-butyl ketone, and water, together with a quantity of 1-butanol having a ratio to the methyl n-butyl ketone in said overhead fraction smaller than the ratio of 1-butanol to methyl n-butyl ketone in the binary azeotrope thereof; azeotropically drying said overhead fraction; fractionally distilling the resulting dry mixture of 1-propanol, methyl n-butyl ketone, and 1-butanol, and separating therefrom a first overhead fraction consisting essentially of 1-propanol, a second overhead fraction consisting essentially of 1-butanol and methyl n-butyl ketone, and a bottom fraction consisting essentially of methyl n-butyl ketone.

5. A process for separating a mixture of organic oxygenated compounds comprising 1-propanol, 1-butanol, and methyl n-butyl ketone which comprises (1) fractionally distilling said mixture in the presence of water and separating therefrom a first distillate fraction containing methyl n-butyl ketone, 1-propanol, and water, together with a quantity of 1-butanol having a ratio to said methyl n-butyl ketone smaller than the ratio of 1-butanol to methyl n-butyl ketone in the binary azeotrope thereof; (2) drying said first distillate fraction; (3) distilling the dried distillate fraction and separating therefrom a second distillate fraction comprising essentially 1-propanol; (4) further distilling said dried distillate fraction and separating therefrom a third distillate fraction containing substantially all of said 1-butanol as an azeotropic mixture with methyl n-butyl ketone, leaving a residuum of purified methyl n-butyl ketone; and (5) recycling said azeotropic mixture from step 4 to step 1.

6. A process for separating an aqueous mixture of organic oxygenated compounds comprising 1-propanol, 1-butanol, and methyl n-butyl ketone which comprises (1) fractionally distilling said mixture and separating therefrom a first distillate fraction containing methyl n-butyl ketone, 1-propanol, and water, together with a quantity of 1-butanol having a ratio to said methyl n-butyl ketone smaller than the ratio of 1-butanol to methyl n-butyl ketone in the binary azeotrope thereof, and a second distillate fraction containing 1-butanol substantially free from methyl n-butyl ketone; (2) drying said first distillate fraction; (3) distilling the dried distillate fraction and separating therefrom a third distillate fraction comprising essentially 1-propanol; (4) further distilling said dried distillate fraction and separating therefrom a fourth distillate fraction containing substantially all of said 1-butanol as an azeotropic mixture with methyl n-butyl ketone, leaving a residuum of purified methyl n-butyl ketone; and (5) recycling said azeotropic mixture from step 4 to step 1.

7. A process for separating an aqueous liquid mixture of organic oxygenated compounds, said mixture being of the type obtained by the hydrogenation of carbon monoxide in the presence of an alkali-promoted iron catalyst, which comprises (1) fractionally distilling said mixture and separating therefrom a first distillate fraction comprising organic oxygenated compounds substantially completely depleted of organic acids; (2) fractionally distilling said first distillate fraction and withdrawing therefrom a second distillate fraction consisting essentially of water, methyl n-butyl ketone, and organic oxygenated compounds originally present in said first distillate fraction boiling below methyl n-butyl ketone; (3) fractionally distilling said second distillate fraction and separating therefrom a bottom fraction comprising 1-propanol, 1-butanol, methyl n-butyl ketone, and water; (4) fractionally distilling said bottom fraction and separating therefrom a third distillate fraction containing methyl n-butyl ketone, 1-propanol, and water, together with a quantity of 1-butanol having a ratio to said methyl n-butyl ketone smaller than the ratio of 1-butanol to methyl n-butyl ketone in the binary azeotrope thereof; (5) drying said third distillate fraction by azeotropic distillation in the presence of a $C_5$—$C_7$ hydrocarbon; (6) distilling the dried distillate fraction and separating therefrom a fourth distillate fraction comprising essentially 1-propanol; (7) further distilling said dried distillate fraction and separating therefrom a fifth distillate fraction containing substantially all of said 1-butanol as an azeotropic mixture with methyl n-butyl ketone, leaving a residuum of purified methyl n-butyl ketone; and (8) recycling siad azeotropic mixture from step 7 to step 2.

HOWARD GREKEL.

REFERENCES CITED

The following references are of record in the file of this patent:

UNITED STATES PATENTS

| Number | Name | Date |
|---|---|---|
| 1,862,706 | Ricard et al. | June 14, 1932 |
| 2,392,534 | Von Keussler | Jan. 8, 1946 |
| 2,476,788 | White | July 19, 1949 |
| 2,500,329 | Steitz, Jr. | Mar. 14, 1950 |